US005487553A

United States Patent [19]
Pileggi

[11] Patent Number: 5,487,553
[45] Date of Patent: Jan. 30, 1996

[54] STEERING FORK FOR BICYCLES

[75] Inventor: James D. Pileggi, Beaverton, Oreg.

[73] Assignee: Halson Designs, Inc., Wilsonville, Oreg.

[21] Appl. No.: 303,175

[22] Filed: Sep. 8, 1994

[51] Int. Cl.⁶ .................................................. B62K 21/04
[52] U.S. Cl. ............................................................ 280/280
[58] Field of Search ...................................... 280/279, 280, 280/274, 281.1

[56] References Cited

U.S. PATENT DOCUMENTS

| 4,819,961 | 4/1989 | Henigue | 280/279 X |
| 4,887,828 | 12/1989 | Chonan | 280/279 X |
| 5,002,297 | 3/1991 | Klein | 280/280 X |
| 5,060,961 | 10/1991 | Bontrager | 280/280 X |
| 5,078,417 | 1/1992 | Mouritsen | 280/280 |

FOREIGN PATENT DOCUMENTS

| 22462 | 5/1948 | Finland | 280/279 |
| 800632 | 7/1949 | Germany | 280/279 |
| 399827 | 11/1942 | Italy | 280/279 |
| 20937 | 9/1896 | United Kingdom | 280/279 |

Primary Examiner—Kevin T. Hurley
Attorney, Agent, or Firm—Robert L. Harrington

[57] ABSTRACT

A steering fork for a bicycle that incorporates interchangeable steerer tubes to facilitate fitting the fork to bicycles having different steering head configurations. A crown of the fork has a hub with an internal taper that is arranged to receive a tapered end of a steerer tube. The mating tapers are press fit together by a tensioning bolt to fixedly secure the steerer tube to the crown of the fork. The portion of steerer tube extending from the tapered end is configured to fit the steering head of a bicycle to which the steering fork is to be mounted.

4 Claims, 1 Drawing Sheet

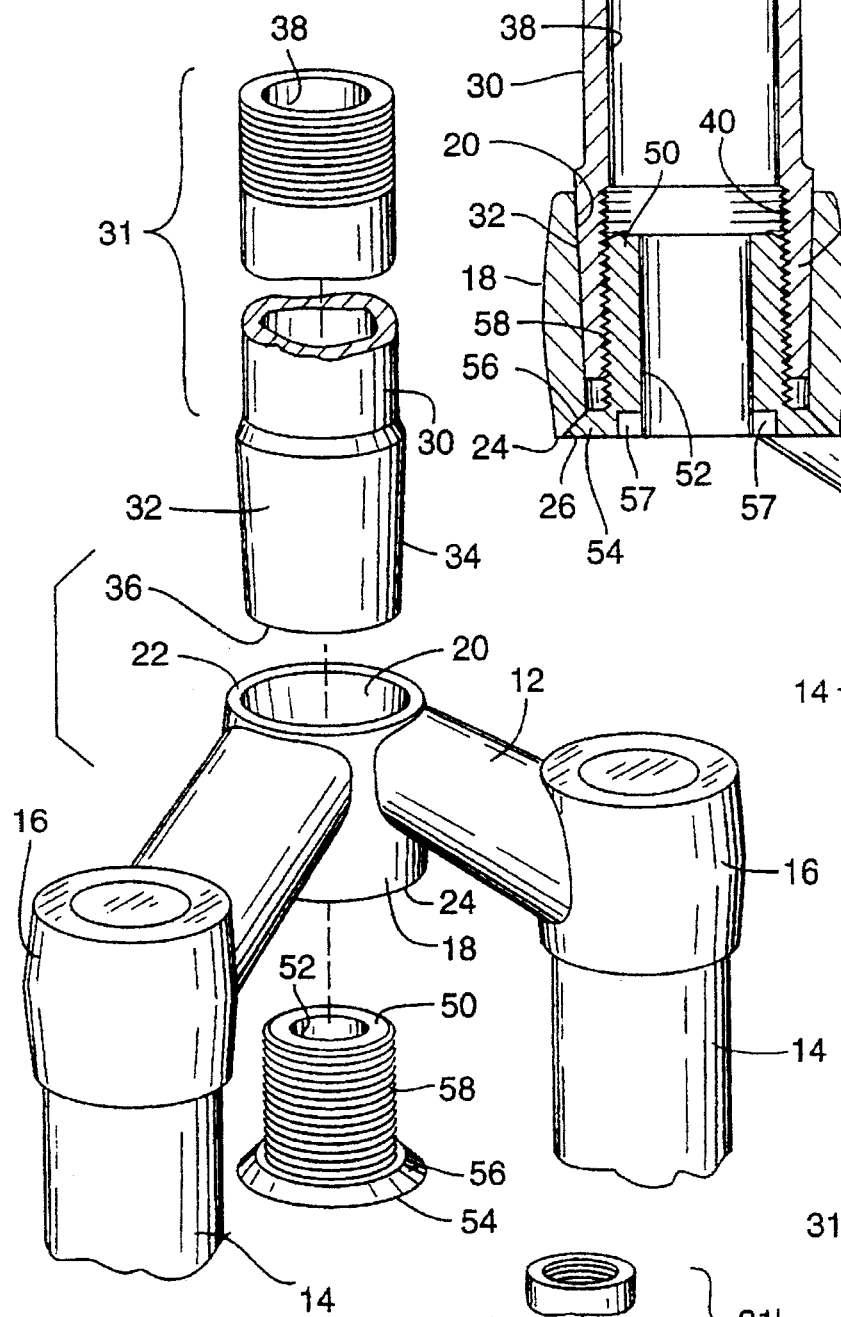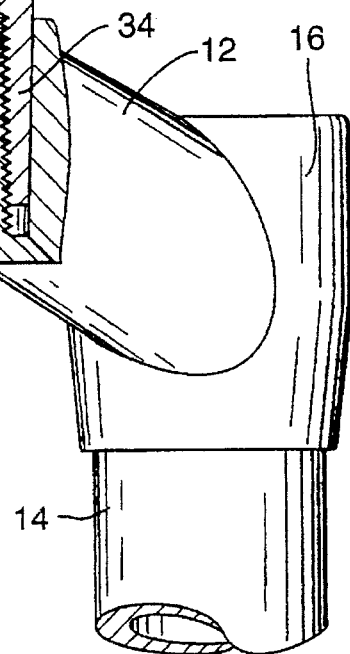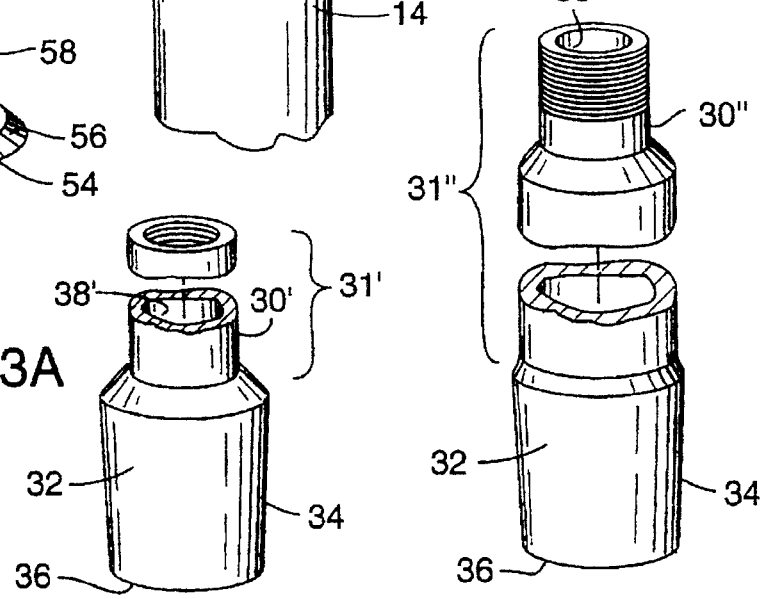

STEERING FORK FOR BICYCLES

FIELD OF THE INVENTION

This invention relates to front wheel forks for bicycles and more particularly it relates to the connection for connecting the steerer tube to the crown of the fork.

BACKGROUND OF THE INVENTION

Bicyclists that ride bicycles in races or over rough terrain may desire to equip their bicycles with shock absorbing front forks. A special shock absorbing fork may be purchased by the bicyclist and he or she will simply remove the standard fork and replace it with the shock absorbing fork.

The bicycle fork connects the front wheel to the frame of the bicycle and to the handlebars which act through the fork to steer the front wheel. The fork includes a strut on each side of the wheel that extends from the wheel axle to a crown that overlies the front wheel and which secures the upper extends of the struts together. A steerer tube extends from the crown upwardly through a head tube on the front of the frame and then interconnects with the bicycle's handlebars.

The shock absorbing fork provides the struts with spring movement for absorbing the jarring action incurred when the front wheel encounters a rut or rock which would otherwise be directly transmitted to the rider through the rigid struts and steerer tube.

There are many different brands and sizes of bicycles with different fitting requirements as between the fork's steerer tube and the bicycle's frame hub and handlebar. However, the struts and crown portion of the fork are fitted to the wheel of the bicycle. Many different brands and even sizes of bicycles are equipped with the same wheel size.

The problem that the above creates is that the manufacturer, dealers and retailers of shock absorbing forks to be retro-fitted onto bicycles, either have to produce and stock a wide variety of full fork assemblies for the different bicycle brands or provide for a common crown and strut subassembly and the capability of interchangeably assembling a variety of steerer tubes to the subassembly. In this latter event, a sufficient quantity of the struts and crown subassemblies (the more expensive components of the shock absorbing fork) can be stocked for universal application and a wide variety of the less expensive steerer tubes can be separately stocked for selective assembly to the crown and strut subassembly as needed.

Heretofore a typical method for interchanging steerer tubes involved the provision of slots in the crown with pinch bolts and sleeves to accommodate different diameters of steerer tubes. The slot weakens the crown causing unwanted flex and stress concentrations. A high degree of stress is generated in the fork assembly at the connection between the crown and steerer tube and accordingly the steerer tubes are typically made of high strength steel which is relatively heavy and undesirable for bicycle construction for that reason.

SUMMARY OF THE INVENTION

The present invention provides interchangeable steerer tube connection to the crowns of the sub-assembly. The preferred embodiment provides the various steerer tube lengths and diameters with a common base portion that connects into the crowns but without slots in the crown and pinch bolts or sleeves. The bottom or base portion of the steerer tube is provided with an exterior taper (frustum-like configuration) and the crown is provided with a configured opening that extends through the crown. The opening has an interior taper mated to the taper of the steerer tube. The bottom end of the base portion of the steerer tube has an internally threaded opening and the configured opening through the crown includes a shoulder that is formed around the bottom of the opening. A bolt is designed with a shank that is threaded to fit the threaded opening in the bottom of the steerer tube and a head that seats against the shoulder surrounding the opening in the crown.

In assembly the steerer tube is inserted into the opening at the top of the crown, and the bolt is inserted into the opening in the bottom of the crown and threadably engaged with the threaded bottom opening in the steerer tube end. The bolt head engages the shoulder around the crown opening and as the bolt is tightened, it draws the tapered steerer tube section down into the tapered opening of the crown to achieve a press fit with surface-to-surface interference throughout the tapered surface areas. The tapered fit significantly reduces the undesired stress line at the point of connection in the prior structure described above. The invention will be more fully appreciated upon reference to the following detailed description and the accompanying drawings.

BRIEF DESCRIPTION OF THE DRAWINGS

FIG. 1 is an exploded view of a bicycle steering fork of the present invention;

FIG. 2 is a sectional view of the fork of FIG. 1 illustrating the steerer tube assembled to the crown of the fork; and FIGS. 3A and 3B illustrate alternate configurations of steerer tubes that can be mounted to the crown of the fork of FIGS. 1 and 2.

Refer now to FIG. 1 of the drawings which illustrates a portion of a steering fork assembly for a bicycle. Only that portion of the fork assembly necessary for an understanding of the present invention is illustrated. A fork assembly of the type herein disclosed is illustrated in the commonly owned U.S. Pat. No. 5,269,549.

The fork assembly has a crown 12 that is arranged for the mounting of extending struts (forks) 14 and a steerer tube 30. The struts 14 extend from hubs (end portions) 16 of the crown 12, with one strut extending on each side of a front wheel of the bicycle with the lower end of each strut having an end of a wheel axle removably attached thereto (e.g., see the above U.S. Pat. No. 5,269,549.

The crown 12 has a (center portion) hub 18 strategically positioned in relation to the hubs 16 and the hub 18 is arranged to receive the removable mounting of the steerer tube 30.

The dimensions and configuration of the portion of the steerer tubes 30 that fit into the steering head of bicycles will vary in dimension from manufacturer to manufacturer and even between different models of the same manufacturer. The portion of the steerer tube 30 that fits into the steering head of a bicycle is generally indicated by the numeral 31. Frequently a user will want to change the fork assembly from a manufacturer's standard to another type such as a shock absorbing fork. Prior to the present invention a large inventory of fork assemblies was required to accommodate all the variations. Alternatively, the interchangeable steerer tubes were made of heavy metal, e.g., steel that could stand the high stress at the point of connection. The present invention provides a unique fork assembly that is arranged for the mounting of interchangeable light weight, e.g., aluminum steerer tubes 30. A user simply selects a steerer tube 30 with a portion 31 that meets the specific requirements of the particular bicycle and installs the steerer tube into the crown 12 of the fork assembly 10. The fork assembly 10 is then installed on the bicycle with the portion 31 of the selected steerer tube 30 fitted to the steering head of the bicycle in a conventional manner.

The assembly of the hub 18 and the steerer tube 30 of the present invention provides greater structural integrity at the connection of the steerer tube 30 with the crown 12. Referring to FIGS. 1 and 2, the hub 18 of the crown 12 has an internal tapered bore 20. In this embodiment the taper of the bore 20 is a #4 Morse taper with the largest diameter of the tapered bore being substantially at the top face (edge) 22 of the hub 18. The hub 18 is chamfered (countersunk) at end 24 to form a peripheral shoulder as indicated by the numeral 26.

The steerer tube 30 has a taper 32 formed on the lower end (base) 34 that will mate with the tapered bore 20 of the hub 18. In this embodiment the taper 32 is a #4 Morse taper with the taper increasing in diameter from end 36 of the tube 30. The steerer tube 30 is hollow primarily for reduction of weight and material and thus has a center opening 38. The opening 38 is threaded at end 34 in a conventional manner, the threads being designated by the numeral 40. The portion of the tube 30 designated by the numeral 31 is configured and sized to fit a steering head of a bicycle.

The steerer tube 30 is fitted in the hub 18 of the crown 12 by inserting the taper 32 (on end portion 34) into the tapered bore 20. The steerer tube 30 is secured and retained in the hub 18 of the crown 12 by a retention sleeve (hollow bolt) 50.

The retention sleeve 50 has a center through bore 52 to reduce the material and thereby the weight of the sleeve 50. The sleeve 50 has a head portion 54 that has a chamfer or bevel 56 that will mate with the chamfer (counter sink) portion 26 of the hub 18. A hex shaped depression 57 (which in this case is a hex shaped hole) is provided in the head portion 54 to facilitate rotating the sleeve 50 using the well known Allen wrench. This configuration is designed to enable significant torque to be applied by the Allen wrench to press fit the bolt into the sleeve. External threads 58 are provided on the shank portion of the sleeve 50 that will threadably engage the threads 40 of the steerer tube 30. The sleeve 50 is threadably installed in the steerer tube 30 with the chamfer 56 coming into contact with the chamfer 26 of the hub 18. As the sleeve 50 is tightened further such as by an Allen wrench engaging the hex depression 57 to rotate the sleeve, the steerer tube will be drawn into the hub 18 to force fit the taper 32 of the tube 30 into frictional contact with the tapered bore 20 of the hub 18. The tapers being in forced frictional contact over the entire interengaging surface areas provide a strong union between the steerer tube 30 and the crown 12. The connection reduces significantly the undesired stress at the point of interconnection and it assures that the steerer tube 30 will not rotate relative to the crown 12.

FIGS. 3A and 3B illustrates examples of the variations in the steerer tubes 30 (indicated as 30' in FIG. 3A and as 30" in FIG. 3B) that are mountable to the hub 18 of the crown 12. All of the tubes (30, 30', 30") have the same basic end portion 34 with an external taper 32 that will matingly engage the tapered bore 20 of the crown 12 as previously described in reference to FIGS. 1 and 2. All of the tubes are thus interchangeably mountable in the hub 18 (crown 12) of the fork assembly of FIG. 1 The portion 31 (indicated as 31' in FIG. 3A and as 31" in FIG. 3B) extending from the end portion 34 is configured to the dimensions and form required for a particular bicycle. The portion 31 will vary in diameter and length according to the requirements of a particular bicycle. The examples shown are not intended to include all variations but are provide as illustrations of how the steerer tube 30 is varied to accommodate the different requirements of different bicycles.

Those skilled in the art will appreciate that modifications and variations may be made without departing from the true spirit and scope of the invention. Whereas the frustum-like surfaces on the steerer tube and crown are described and shown to be conical in configuration, other configurations are available, e.g., as in the shape of a pyramid. Also it is contemplated that the invention will provide a benefit where only the struts are common to a variety of bicycle types and sizes. Thus the replaceable portion will be both the steerer tube and crown. The various crowns would provide a common interfit to the struts and the fit between the crown and steerer tube would vary one from the other. The invention is therefore not to be limited to the embodiment(s) described and illustrated but is to be determined from the appended claims.

I claim:

1. A steering fork for a bicycle comprising:

struts for connection to an axle of a bicycle front wheel at each side of the wheel, and a crown interconnecting the struts, an opening through the crown defining an interior wall surface having a frustum-like taper with its large end at the top of the crown, the bottom of the opening defining a peripheral shoulder;

multiple replaceable steerer tubes having application to different bicycle designs with base portions having an exterior outer wall surface with a frustum-like taper that coincides with the interior wall surface of the opening in the crown, said base portions of said steerer tubes having an open bottom end exposing a straight inner wall portion provided with screw threads; and a bolt having a head portion and a shank portion, the head portion sized to fit against the shoulder defined in the bottom of the opening in the crown and the shank portion provided with screw threads that mate with the screw threads of the inner wall portion of the steerer tube whereby, the base portion of the steerer tube is inserted in the opening through the crown, the bolt is engaged with the threaded opening in the steerer tube and the head of the bolt is seated against the shoulder of the crown as the bolt is screwed into the steerer tube to effectively press fit the tapered exterior wall surface of the steerer tube against the tapered interior wall surface surrounding the opening in the crown.

2. A steering fork for a bicycle as defined in claim 1 wherein all of the steerer tubes have a common base portion and the frustum-like surfaces are conical in configuration, and wherein the replaceable steerer tubes are hollow and made of light weight aluminum as permitted by the reduction of stress at the point of connection between the crown and steerer tubes.

3. A steering fork for a bicycle as defined in claim 1 wherein the peripheral shoulder and the head portion of the bolt are cooperatively configured for the head to nest against the shoulder, the bolt head being flat and not protruding below the shoulder of the crown.

4. A steering fork for a bicycle as defined in claim 3 wherein the flat head is provided with a hex depression for engagement by an Allen wrench for press fit engagement as between the two frustum-like surfaces.

* * * * *